Aug. 25, 1936.  R. S. SANFORD  2,051,904
BRAKE
Filed Nov. 9, 1932  2 Sheets-Sheet 1

INVENTOR.
ROY S. SANFORD
BY
ATTORNEY.

INVENTOR.
ROY S. SANFORD
BY
ATTORNEY.

Patented Aug. 25, 1936

2,051,904

UNITED STATES PATENT OFFICE 2,051,904

BRAKE

Roy S. Sanford, South Bend, Ind., assignor to Bendix Aviation Corporation, South Bend, Ind., a corporation of Delaware Application November 9, 1932, Serial No. 641,901

14 Claims. (Cl. 188—78)

This invention relates to brakes and more particularly to a servo brake which is readily controllable by varying at will the length of shoe employed for braking.

In common servo brakes such as are employed for automobile and aviation use, the length of brake shoe is ordinarily fixed, and the braking effect is varied by varying the pressure applied to the brake shoe usually at the ends. Such constructions while giving excellent result are often subject to a common fault, that of being too sensitive, or uncontrollable particularly when substantially the full capacity of the brake is utilized. This invention is therefore directed toward a servo brake structure wherein the braking effect may be accurately controlled by varying at will the length of shoe which engages the drum, the actuating mechanism otherwise applying a fixed pressure to the shoe at all times.

An object of the invention therefore is to provide a servo brake having improved characteristics particularly with reference to controllability and sensitiveness.

A further object of the invention is to provide a brake structure wherein the brake applying force is maintained constant, and in which the braking effect is varied by changing the position where the force is applied.

A further object of the invention is to provide in a brake structure having a flexible brake shoe anchored at one end, an applying means which may be directed toward any portion of the shoe to vary the length of shoe utilized and the braking effect.

A still further object of the invention is to provide in a brake structure having a flexible band brake shoe anchored at one end applying means and release positioning means adapted to apply a variable section of the shoe while retaining the remainder in proper release position.

Figure 1:
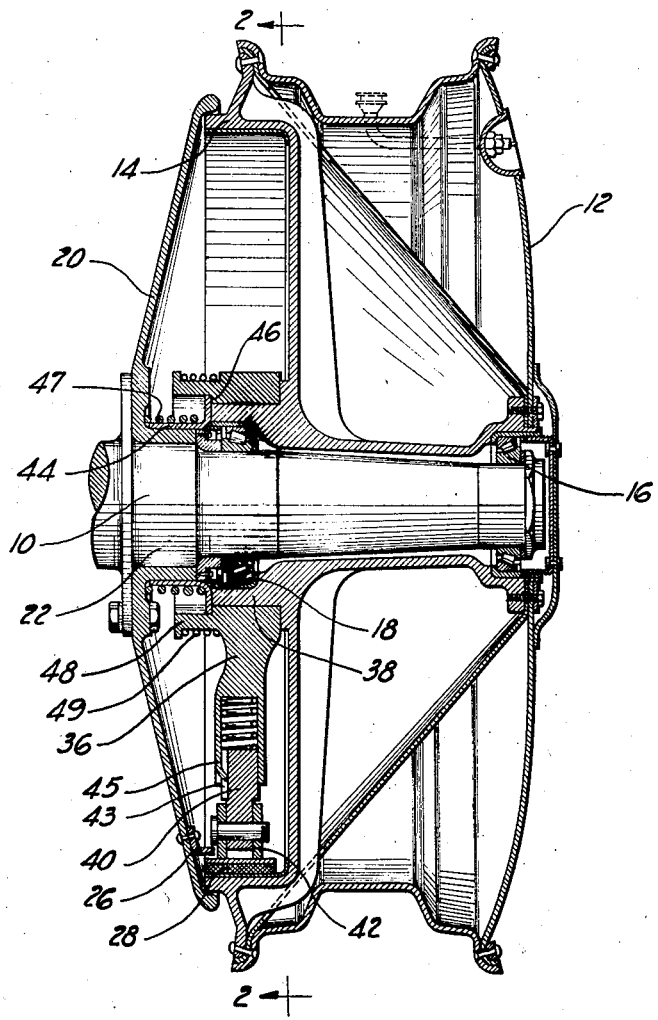
Figure 1 is an axial section through a combination wheel and brake showing a preferred form of brake in accordance with the invention.
Figure 2:
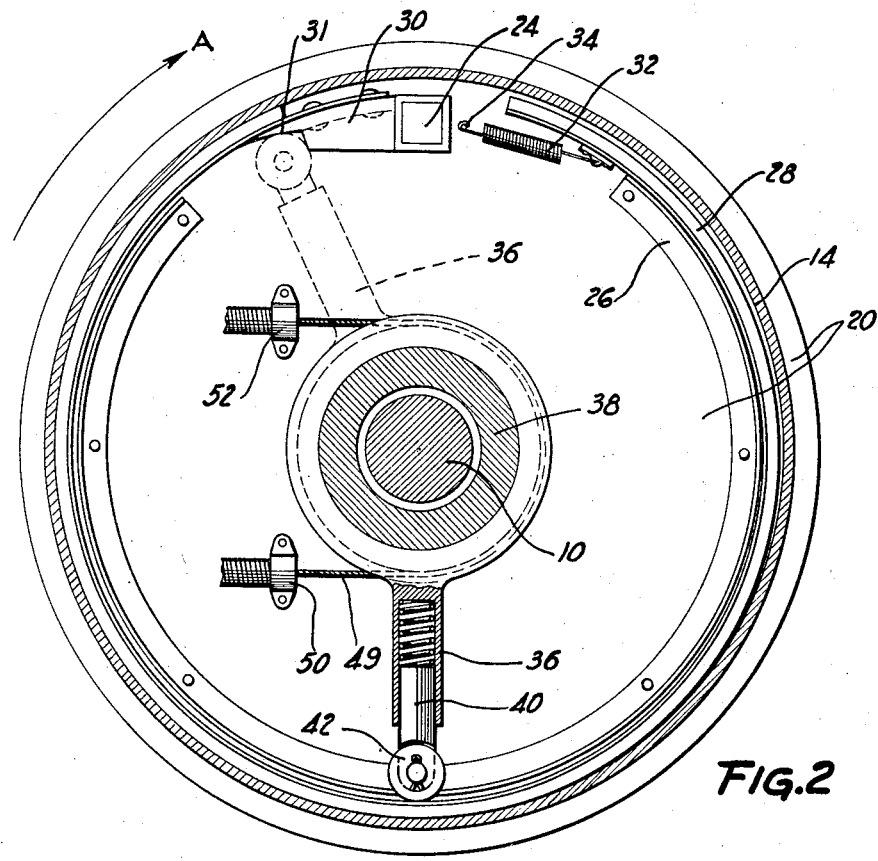
Figure 2 is a section taken on the line 2—2 of Fig. 1, just inside the brake drum back and illustrating actuating mechanism.

Referring to the drawings and particularly to Figs. 1 and 2, there is illustrated a wheel 12 having a brake drum 14 adapted for aviation use, rotatably mounted on a spindle 10 by means of anti-friction bearings 16 and 18. A backing plate 20 preferably of stream line design as shown is secured to a shoulder 22 on the spindle by any suitable fastening means and carries thereon an anchor 24 and a circular angle iron member 26 positioned so as to form a rest for a flexible brake band or shoe such as indicated at 28. Since the channel member provides a rest for the brake shoe when in released position, it is preferably positioned so that the brake shoe may just clear the drum when in released position and in engagement with the angle iron.

As shown, the anchor 24 may be square in cross-section and carry thereon a shoe end fitting 30 having a square recess snugly fitting the anchor, the shoe end fitting being secured to the flexible brake band 28. The opposite end of the brake band is preferably provided with a spring 32 secured at one end to a stationary pin 34 on the backing plate whereby the brake band may be urged into released position and rest against the circular angle iron member 26. It will be readily observed that to replace the friction lining requires the mere removal of the band from the anchor 24 and uncoupling of the spring 32.

To actuate the brake there is provided a radially extending actuator member 36, rotatably secured upon the wheel hub 38 within the brake drum, and carrying a spring pressed plunger 40.

For free rolling contact of the brake band 28, a roller the inner surface of the brake band 28, a roller 30 or pair of rollers 42 may be provided, and a spline 43 in the side of the plunger engaging a struck in or tongue finger 45 on the member 36 may be employed to prevent relative rotation therebetween, so that the rollers may always lie in a plane parallel to that of the brake.

To retain the actuating member upon the wheel hub, a suitable retaining collar such as 44 may be provided together with a spring 47 for urging the same axially into engagement with the hub and shoulder 46 provided on the member 36.

Rotation of the actuating member may be accomplished by the use of a cable 49 wrapped upon the drum-like extension 48 on the actuating member 36, and extending out through a pair of suitable guide apertures 50 and 52 in the backing plate from whence the cables may extend to any desired or common type of control member.

The shoe end fitting 30 is provided with a slightly inclined ramp 31 upon which the rollers of the actuating member may be run when the brake is in release position, the square anchor serving, together with the rigid end fitting, to prevent the shoe from engaging the drum, when the actuator is so positioned.

Figure 3:
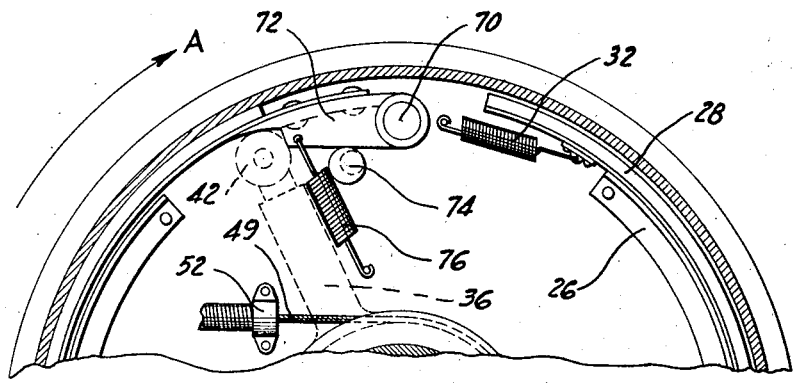
Figure 3 is a section similar to Fig. 2 showing an alternative form of adjustable rest for the actuator when placed in an off position.

A modified form having a round anchor 70 is shown in Figure 3, wherein the brake band is provided with an end fitting 72 pivoted upon the anchor. To adjustably fix this end fitting, an adjustable eccentric 74 is provided together with a heavy tension spring 76, which spring is sufficient to overcome any effect of the spring pressed plunger in the actuator member.

In operation, it will readily appear that the brake is best adapted, in the simple form shown, to brake for one direction of rotation only as indicated by arrow A. By rotating the actuator to any desired position, a corresponding section of the flexible brake band is pressed into drum engagement whereupon the drum rotation due to the friction between the band and drum, will apply to the drum the remainder of the flexible brake band which lies between the actuator applied section and the anchor, this process being described by the term self actuation which is well understood in the art. In each instance the remainder or unused portion of the brake band is retained against the annular angle iron or stop ring 26 and is ineffective for braking, by tension of the spring 32.

Since the spring pressing the plunger may be relatively light but highly compressed or loaded, a practically uniform pressure may be expected from the plunger upon the brake shoe in all positions even should the drum be slightly out of true or the lining thickness vary, the resulting braking effect can therefore vary only in accordance with the amount of brake shoe employed. The plunger spring can be varied in designing the brake to give any desired maximum characteristics, upon full application, as well as the lining and other variables, which will be well understood in the art.

The structure of such a brake is extremely light, permits the easy exchange of brake shoes and provides for controllability which is highly desirable in aviation use since brakes which are apt to lock impose severe and unwarranted stresses upon landing gear of the ship.

I claim:

1. A brake comprising a drum, an anchor, a flexible friction band secured at one end to said anchor, and means adapted to selectively engage any portion of said band to engage the band with the drum.

2. A brake comprising a drum, an anchor, a flexible friction band secured to said anchor at one end, and actuating means, said actuating means adapted to engage said band at any point and urge said band into drum engagement.

3. A brake comprising a drum, flexible friction means, and actuating means adapted to rotate about the brake drum axis and regulate the extent of the length of engagement of said friction means with the drum.

4. A brake comprising a drum, flexible friction means anchored at one end adjacent thereto, and means for applying any desired point of said friction means to the brake drum, whereby rotation of said drum in one direction will apply the intervening section of said friction means between the anchor and applied point.

5. A brake having a drum, a flexible friction means anchored at one end, and a revolvable actuator concentric with said drum for radially applying selected portions of said friction means.

6. A brake comprising a drum, friction means adjacent said drum and anchored at one end, means to selectively radially engage said friction means at any one of a plurality of points to engage said friction means with said drum, whereby drum rotation in one direction may apply the portion of said friction means intervening between said anchor and said section.

7. A brake comprising a drum, a flexible friction means anchored at one end, and an actuator for said friction means adapted to apply a fixed radial pressure to said flexible friction means, and means for varying at will the position for applying radial pressure.

8. A brake comprising a drum, an anchor, a friction element secured thereto, a rigid cam on said anchor and an applying means for engaging and radially urging said element into drum engagement, said applying means being adapted for rotation onto said cam and out of engagement with said element.

9. A brake comprising a drum, a flexible friction band, an anchor at one end thereof, a concentrically pivoted radial extending actuator arm, a spring pressed plunger therein adapted to engage said friction band and urge the same into drum engagement and means for rotating said actuator arm.

10. A brake having a flexible brake shoe, an irregular shaped anchor, and rigid means detachably securing one end of said shoe to said anchor and closely fitting said irregular shaped anchor for holding said end against rotation with respect to said anchor, and brake actuating means adapted to engage said means when in released position.

11. A brake comprising a flexible brake band anchored at one end, release positioning means along the length of said band providing a fixed release clearance, and means for fully applying one part of the brake band while retaining the other part in fully released position.

12. In a drum brake, a continuous flexible brake shoe anchored at one end, means for fully applying one portion of said shoe while retaining the other portion in fully released position with full normal release clearance.

13. In a drum brake, a continuous flexible brake shoe anchored at one end, means for applying a fixed pressure to the brake shoe at any desired point at will to regulate braking torque.

14. In a drum brake, a continuous flexible shoe anchored adjacent one end, and means for fully applying all or a portion of said shoe adjacent the anchor while retaining the remainder in proper release position.

ROY S. SANFORD.